US009438557B2

(12) United States Patent
Chatterjee et al.

(10) Patent No.: US 9,438,557 B2
(45) Date of Patent: Sep. 6, 2016

(54) ADAPTIVE DYNAMIC HOST CONFIGURATION PROTOCOL ASSIGNMENT WITH VIRTUAL LOCAL AREA NETWORK POOL

(71) Applicant: ARUBA NETWORKS, INC., Sunnyvale, CA (US)

(72) Inventors: Avignan Chatterjee, Karnataka (IN); Harsha Nagaraja, Karnataka (IN); Isaac Theogaraj, Karnataka (IN); Pradeep Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 207 days.

(21) Appl. No.: 14/263,622

(22) Filed: Apr. 28, 2014

(65) Prior Publication Data

US 2015/0312208 A1 Oct. 29, 2015

(51) Int. Cl.
*H04L 29/08* (2006.01)
*H04L 29/12* (2006.01)
*H04L 12/46* (2006.01)

(52) U.S. Cl.
CPC ....... *H04L 61/2015* (2013.01); *H04L 12/4641* (2013.01); *H04L 61/2061* (2013.01)

(58) Field of Classification Search
CPC .......................... H04L 61/2015; H04L 67/10
USPC ........ 709/220, 226, 238, 245; 370/254, 257, 370/352
See application file for complete search history.

(56) References Cited

U.S. PATENT DOCUMENTS

| 2009/0222590 A1* | 9/2009 | Van Aken | H04L 12/2801 709/249 |
| 2010/0191839 A1* | 7/2010 | Gandhewar | H04L 29/12028 709/220 |
| 2015/0256356 A1* | 9/2015 | Armbruster | H04L 12/4641 370/235 |

OTHER PUBLICATIONS

"Configuring a LAN with DHCP and VLANs"—Cisco Oct. 2012 https://www.cisco.com/en/US/docs/routers/access/800/850/software/configuration/guide/dhcpvlan.pdf.*

* cited by examiner

*Primary Examiner* — Randy Scott (57) ABSTRACT

The present disclosure discloses a method and network device for adaptive DHCP assignment with VLAN pool. Specifically, a network device can assign a client device to a first Virtual Local Area Network (VLAN). The network device then detects a first DHCP Discover message, transmitted by a client device, corresponding to a first VLAN. Also, the network device determines that no DHCP offer message, responsive to the first DHCP Discover message, is transmitted to the client device. Then, the network device transmits on behalf of the client device a second DHCP Discover message for the second VLAN to a DHCP server, and receives a DHCP Offer message in response to the second DHCP Discover message. The network device then assigns the client device to a second VLAN, and subsequently transmits the DHCP Offer message for the second VLAN to the client device.

19 Claims, 6 Drawing Sheets

ADAPTIVE DYNAMIC HOST CONFIGURATION PROTOCOL ASSIGNMENT WITH VIRTUAL LOCAL AREA NETWORK POOL

FIELD

The present disclosure relates to VLAN management in a wireless local area network (WLAN). In particular, the present disclosure relates to a mechanism for adaptive DHCP assignment with VLAN pools in WLANs.

BACKGROUND

Wireless digital networks, such as networks operating under the current Electrical and Electronics Engineers (IEEE) 802.11 standards, are spreading in their popularity and availability. Conventionally, on mobility controllers with Virtual Local Area Network (VLAN) pool configuration in Virtual Access Point (VAP), wireless stations are assigned with a VLAN identifier based on a number of algorithms in a station management module (STM), such as, the HASH algorithm, the EVEN algorithm, etc. However, the HASH algorithm can oversubscribe any one DHCP pool and thus fail to assign Internet Protocol (IP) address to station while other DHCP pools have available addresses in the pool.

The EVEN algorithm attempts to perform load balancing across VLAN assignments. However, in an environment with multiple controllers in the WLAN, each controller may not have an overall view of the network. Thus, if the same DHCP pool is being used by multiple controllers, there can be situations where the assigned VLAN to a station does not have any available IP address in its DHCP pool, whereas some other VLAN in the VLAN pool has IP address available in its DHCP pool.

In general, both the EVEN algorithm and the HASH algorithm of VLAN assignment have problems, with which associating client device might not be able to obtain an available IP address from a DHCP pool corresponding the client device's assigned VLAN.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to VLAN management in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to VLAN management in a wireless local area network (WLAN). In particular, the present disclosure relates to a mechanism for adaptive DHCP assignment with VLAN pools in WLANs. According to embodiments of the present disclosure, the system can assign a client device to a first Virtual Local Area Network (VLAN). The network device then detects a first DHCP DISCOVER message, transmitted by a client device, corresponding to a first VLAN. Also, the network device determines that no DHCP OFFER message, responsive to the first DHCP DISCOVER message, is transmitted to the client device. Then, the network device transmits on behalf of the client device a second DHCP DISCOVER message for the second VLAN to a DHCP server, and receives a DHCP OFFER message in response to the second DHCP DISCOVER message. The network device then assigns the client device to a second VLAN, and subsequently transmits the DHCP OFFER message for the second VLAN to the client device.

Computing Environment

Figure 1:
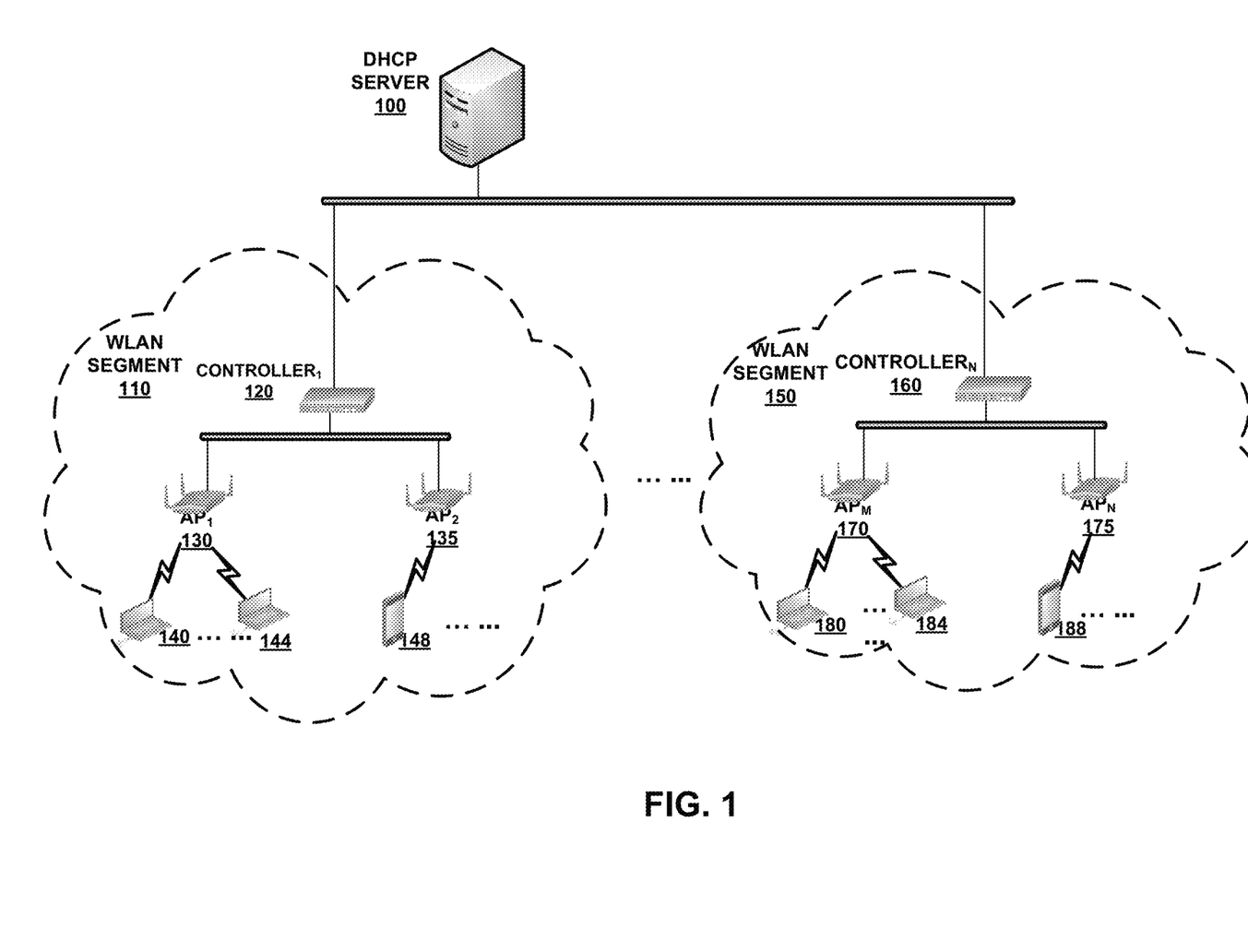
FIG. 1 shows exemplary computing environment according to embodiments of the present disclosure.

FIG. 1 shows exemplary computing environment according to embodiments of the present disclosure. Specifically, FIG. 1 includes a DHCP server 100 and a plurality of WLAN segments, e.g., WLAN segment 110 to WLAN segment 150 in a wireless local area network (WLAN).

The WLAN also may be connected to Internet or another external network via a routing and/or gateway device. Moreover, each WLAN segment includes a controller. For example, WLAN segment 110 includes controller$_1$ 120; and, WLAN segment 150 includes controller$_N$ 160.

In addition, each controller is communicatively coupled with one or more access points (APs). For example, controller$_1$ 120 is communicatively coupled AP$_1$ 130 and AP$_2$ 135 to provide wireless network services to client devices connected to WLAN segment 110; and, controller 160 is communicatively coupled with AP$_M$ 170 and AP$_N$ 175 to provide wireless network services to client devices connected to WLAN segment 150.

Furthermore, one or more client devise are associated with each AP. As illustrated in FIG. 1, client devices 140-144 are associated with AP$_1$ 130 in WLAN segment 110; client device 148 is associated with AP$_2$ 135 in WLAN segment 110; client devices 180-184 are associated with AP$_M$ in WLAN segment 150; client device 188 is associated with AP$_N$ 175 in WLAN segment 150, etc. Note that, client devices may be connected to the access points via wired or wireless connections.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

DHCP server 100 generally provides Internet Protocol (IP) addresses to client devices in the WLAN. Specifically, DHCP server 100 maintains a plurality of DHCP pools. Each DHCP pool generally corresponds to a virtual local area network (VLAN). When an AP (e.g., AP1 130) receives a DHCP DISCOVER message from a client device (e.g., client device 140), the AP will assign a VLAN to the client device and also tag the DHCP DISCOVER message with the VLAN identifier. Upon receiving a DHCP DISCOVER message with the VLAN identifier, DHCP server 100 assigns an available IP address from a DHCP pool corresponding to the VLAN as identified by the VLAN identifier.

During operations, DHCP server 100 provides IP addresses for client devices associating with two or more WLAN segments (e.g., WLAN segment 110 to WLAN segment 150) in a WLAN. For illustration purposes, a client device associated with WLAN segment 110 may roam to a different WLAN segment 150, and be assigned a new IP address from the same DHCP pool by DHCP server 100. Moreover, other client devices connected to other WLAN segments but belonging to the same VLAN as the client device will also be assigned with IP addresses from the same DHCP pool by DHCP server 100. Thus, it is possible that when the client device roams back to WLAN segment 110 from WLAN segment 150, there is no more available IP address that can be assigned from the DHCP pool by DHCP server 100.

Because controller$_1$ 120 in WLAN segment 110 does not have an overall view of the network, controller$_1$ 120 will not detect or be notified that there is no available IP address in the DHCP pool corresponding to the VLAN assigned to the client device. Thus, controller$_1$ 120 will continue to assign the client device to the same VLAN whose corresponding DHCP pool has no available IP address. As a result, the client device will fail to obtain an IP address after roaming back to WLAN segment 110 from WLAN segment 150.

Moreover, when controller$_1$ 120 receives a NACK message destined to client device 140 indicating a failure to obtain the requested IP address from DHCP server 100, there can be many reasons, e.g., connection failure, lack of available IP address in the DHCP pool, etc. Typically, a NACK message from DHCP server 100 conveys to client device 140 that client device 140 needs to attempt for another DHCP Discover message, but the NACK message does not specifically indicate to client device 140 that the failure is due to lack of IP addresses in the requested DHCP pool.

Currently, there is no mechanism for controller$_1$ 120 to troubleshoot the cause upon failure to obtain an IP address from DHCP server 100, because controller$_1$ 120 typically has no visibility to whether a particular DHCP pool on DHCP server 100 has available IP addresses. Neither is there any standardized mechanism for controllers from different WLAN segments consuming the same DHCP service from the same DHCP server, e.g., DHCP server 100, to communicate with each other regarding the DHCP address assignments.

Because client device 140 fails to obtain an IP address in response to its DHCP DISCOVER message, client device 140 will retry the DHCP DISCOVER message. Also, because controller1 120 is unaware of the unavailability of the IP addresses in the DHCP pool corresponding to the original VLAN assignment, controller$_1$ 120 is likely to the use the same VLAN assigning mechanism to assign the same VLAN to client device 140. The VLAN assigning mechanism can be, for example, based on a hash function of a client device's Media Access Control (MAC) address, or a round robin algorithm. As a result, client device 140 will continue encounter failure to obtain the IP address from DHCP server 100.

In some cases when DHCP server 100 does not respond to the DHCP Discover message at all, client device 140 will get an internal IP address in a reserved IP address space, which does not provide for any inter-network connectivity. Also, if, after a threshold number of retries, client device 140 still fails to obtain an IP address from DHCP server 100, client device 140 will be assigned an internal IP address. Alternatively, instead of setting an upper limit on the number of retires, client device 140 may increase the retry interval exponentially, which will eventually lead to assignment of an internal IP address due to exceeding a predetermined time out value.

According to embodiments of the present disclosure, a network device, such as a controller and/or an AP, can adaptively identify when IP address corresponding to a particular DHCP pool is not available at a DHCP server, and obtain an IP address on behalf of a client device from a different DHCP pool.

Adaptive DHCP Assignment

Generally speaking, adaptive DHCP assignment attempts to allocate an IP address to a wireless client device, as long as some free leases are available in any DHCP pool in any VLAN in the VLAN pool. Specifically, a particular VLAN from within the VLAN pool is initially assigned to the associating station. A controller will monitor network traffic for DHCP DISCOVER packets originated from the associating station on the particular VLAN, and wait for any DHCP OFFER packet from the DHCP server. Also, the controller will store a copy of the DHCP DISCOVER packet internally. If there is no DHCP OFFER packet received on the particular VLAN after a predetermined period of time, then the controller will flood the DHCP DISCOVER packet on other VLANs in VLAN pool.

If any DHCP OFFER packet is received from any VLAN by the controller, then the controller will store a copy of the DHCP OFFER packet and will internally change the associating station's VLAN assignment. Then, the controller will forward the DHCP OFFER packet to the associating station. Subsequently, the associating station will send a DHCP REQUEST packet, which will be transmitted on the newly assigned VLAN.

On the other hand, if multiple DHCP servers on different VLANs have replied with DHCP OFFER packets, the controller can choose one of the DHCP OFFER packets, e.g., the first received DHCP OFFER packet. Then, the controller can send a DHCP REQUEST packet on behalf of the associating station to all of the DHCP servers on their corresponding VLANs, such that the DHCP servers that have responded will not hold the offered IP addresses, but will make it available immediately. Upon receiving the DHCP REQUEST packets, the DHCP servers that are not on the selected VLAN will each send a NAK packet for acknowledgement, whereas the DHCP server on the selected VLAN will send an ACK packet for acknowledgement. Accordingly, the DHCP transaction will complete for the associating station, which will get assigned an IP address from another VLAN if the initial VLAN did not have any IP address available in DHCP pool, or if the DHCP server is unavailable.

Note that, this approach can be used to assign IP addresses on a best effort basis with multiple DHCP pools on a group of VLANs. FIGS. 2A-2F illustrate step-by-step adaptive DHCP assignment with VLAN pool according to embodiments of the present disclosure. FIGS. 2A-2F each includes a client 200, a controller 245, and a DHCP server 250. Moreover, controller 245 maintains a VLAN pool 240, which includes a plurality of VLAsNs, such as $VLAN_{10}$ 210, $VLAN_{20}$ 220, $VLAN_{30}$ 230, etc. When client device 200 connects to controller 245, controller 245 will assign a VLAN from VLAN pool 245 for client device 200. The assignment may be based on a hash function (e.g., a hash of the MAC address of client device 200), or based on a round robin fashion. For illustration purposes only, assuming that controller 245 has assigned client device 200 to be a member of $VLAN_{10}$.

A. Initial DHCP Discover Message

Figure 2A:
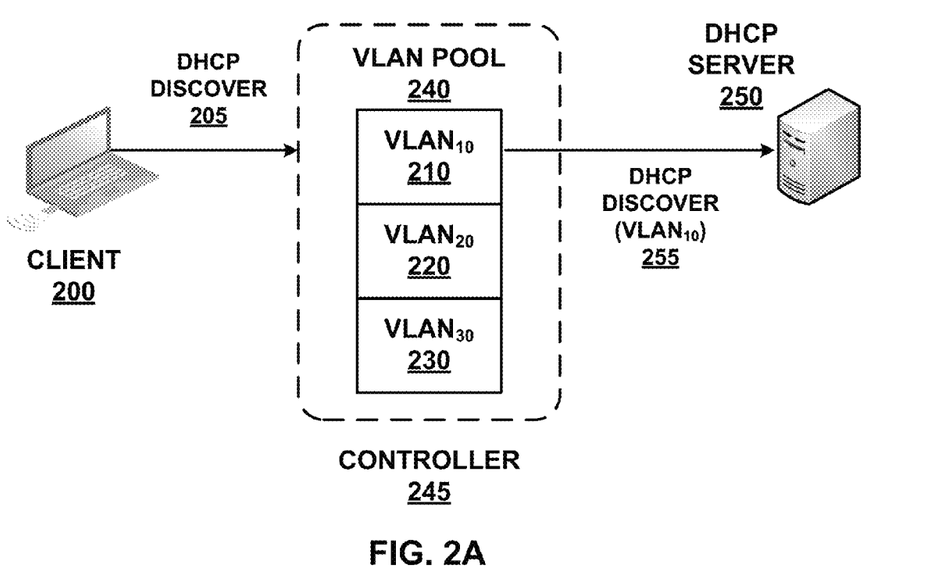
FIGS. 2A-2F illustrate exemplary adaptive DHCP assignments according to embodiments of the present disclosure.

Referring to FIG. 2A, initially, client device 200 requests an IP address by transmitting a DHCP Discover message 205 to controller 245. Because controller 245 has assigned client device 200 to $VLAN_{10}$, controller 245 will forward the received DHCP Discover message on $VLAN_{10}$. In particular, controller 245 will create a station entry for client device 200, transmit DHCP Discover message ($VLAN_{10}$) 255 to DHCP server 250, and wait for a predetermined period of time.

Assuming that, DHCP server 250 has no available IP address in the DHCP address pool corresponding to $VLAN_{10}$. Therefore, DHCP server 250 will either not respond to DHCP Discover message 255 within the predetermined period of time or respond with an NACK message.

B. DHCP Discovery Message Flooding

Figure 2B:
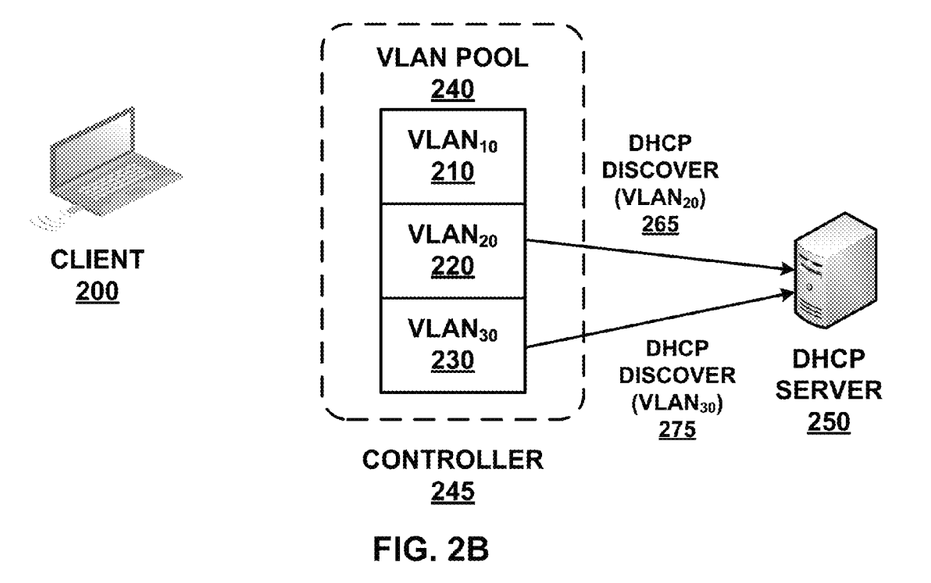

Referring to FIG. 2B, when controller 245 fails to receive a DHCP Offer message from DHCP server 250 in response to DHCP Discover message 255 within the predetermined period of time, controller 245 will transmit, on behalf of client device 140, a plurality of DHCP Discover messages on multiple VLANs. For example, controller 245 will transmit DHCP Discover message 265 on $VLAN_{20}$, and will also transmit DHCP Discover message 275 on $VLAN_{30}$.

In some embodiments, controller 245 may keep track of a subset of VLANs in VLAN pool 240 that does not have any available IP address based on prior communications with DHCP server 250 involving DHCP requests from other client devices. For example, if another client device previously assigned to $VLAN_{40}$ (not shown) failed to obtain an IP address from DHCP server 250 after a threshold number of retries, controller 245 will mark $VLAN_{40}$ as a VLAN that has no available IP address. Then, controller 245 selects the remaining VLANs in VLAN pool 240 that are not in the subset of the VLANs having no available IP address, and transmit a DHCP Discover message on each of the remaining VLANs. Note that, the threshold number of retires do not have to be all initiated by the same client device. If multiple client devices consecutively have tried and failed to obtain an IP address on $VLAN_{40}$ during the same period of time, controller 245 will also mark $VLAN_{40}$ as a VLAN that has no available IP address.

In some embodiments, to improve the accuracy of the subset of VLANs, controller 245 may request an IP address from a VLAN in the subset periodically. For example, at a preconfigured time interval, controller 245 may iterate through the subset of VLANs that were previously identified as having no available IP addresses, and send a DHCP Discover message on each of the VLANs in the subset to determine dynamically whether IP addresses in any VLAN in the subset has subsequently become available. If controller 245 receives a DHCP Offer on a particular VLAN in the subset, controller 245 will remove the particular VLAN from the subset. Thus, when controller 245 later floods DHCP Discover messages to DHCP server 250, the DHCP Discover message will be transmitted on the particular VLAN as well.

C. Receipt of DHCP Offer Messages

Figure 2C:
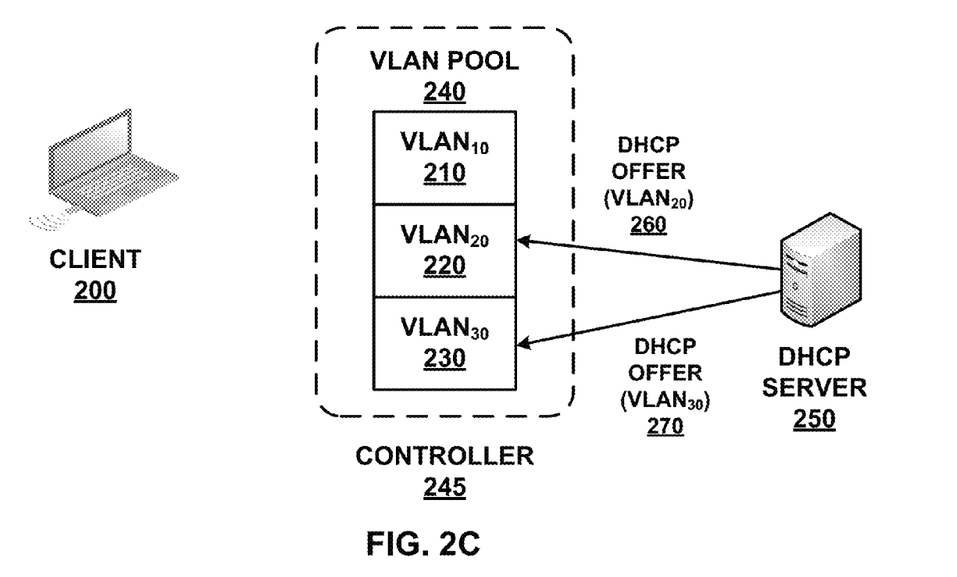

Referring to FIG. 2C, for illustration purposes only, assuming that DHCP server 250 transmits DHCP Offer message 260 on $VLAN_{20}$ first, and then transmits DHCP Offer message 270 on $VLAN_{30}$. As a result, controller 245 receives DHCP Offer message 260 prior to DHCP Offer message 270.

D. VLAN Re-Assignment

Figure 2D:
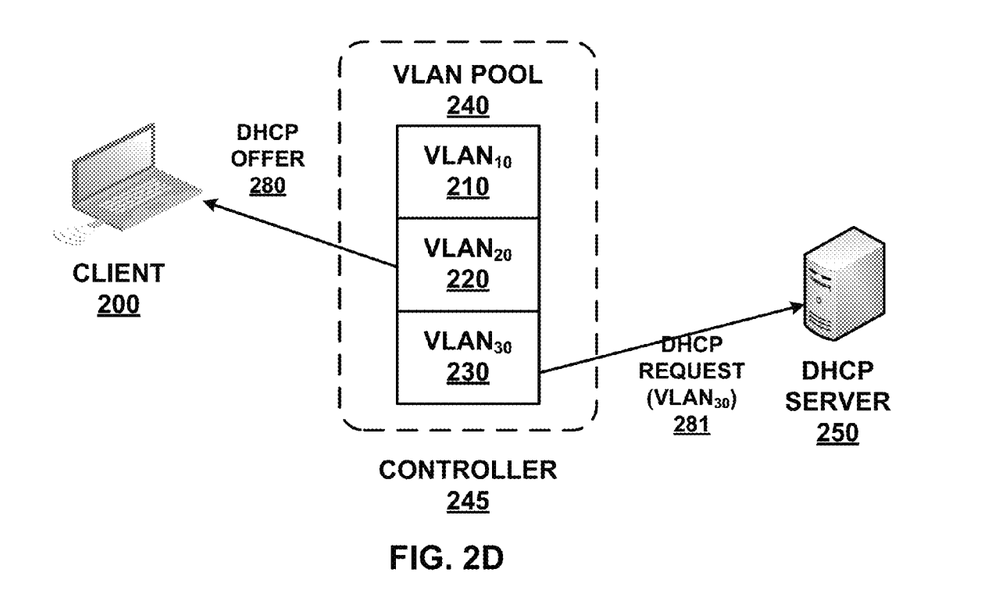

Referring to FIG. 2D, controller 245 will select one of the VLANs on which a DHCP Offer is received, and re-assign client device 200 to the selected VLAN. For example, controller 245 can select the VLAN on which the first DHCP Offer message is received. Thus, in this example, because the first DHCP Offer message is received on $VLAN_{20}$, controller 245 will re-assign client device 200 to $VLAN_{20}$.

A unique entry will be created in a station table and a MAC user table for each client device connected to controller 245. Once a client device successfully obtains an IP address from DHCP server 250, a user entry will be created for client device 200. To re-assign the VLAN to client device 200 from $VLAN_{10}$ to $VLAN_{20}$, a DHCP proxy process at controller 245 will notify an authentication management process that the VLAN for client device 200 has been changed from $VLAN_{10}$ to $VLAN_{20}$. Authentication management process performs Layer-2 authentication in an OSI model for any users of WLAN. After authentication management process updates the VLAN for client device 200 in the MAC user entry, authentication management process notifies a station management process of the VLAN reassignment.

In some embodiments where mobile IP process is applicable, the mobile IP process is notified by the DHCP proxy process of the VLAN reassignment for client device 200 prior to the authentication management process being notified of the VLAN reassignment. Mobile IP process generally ensures that a client device will retain the same IP address during while the client device roams between multiple access points and/or network controllers. Thus, mobile IP process is a mechanism for providing layer-3 mobility to WLAN client devices. Mobile IP process will add $VLAN_{20}$ in the bridge entry for client device 200 after receiving the notification from the DHCP proxy process.

After the station management process updates the VLAN change in the station entry, the station management process further notifies datapath that the VLAN for client device 200 has been reassigned. Datapath generally refers to a data plane process responsible for data forwarding. Once datapath completes the VLAN update, the datapath will notify the DHCP process that the VLAN reassignment has been completed.

If mobile IP is enabled at controller 245, the mobile IP process will be notified that the VLAN reassignment has been completed for client device 200. After receiving such notification, mobile IP process will remove $VLAN_{10}$ from the bridge entry for client device 200.

After client device 200 is re-assigned to $VLAN_{20}$, controller 245 transmits DHCP Offer message 280 to client device 200. It is important that controller 245 transmits DHCP Offer message 280 to client device 200 subsequent to the VLAN re-assignment. This is because, if controller 245 transmits DHCP Offer message 280 prior to reassigning client device 200 to $VLAN_{20}$, client device 200 may transmit a DHCP Request message, which could be received by controller 245 prior to the VLAN re-assignment. As a result, controller 245 will incorrectly forward the DHCP Request message from client device 200 on the initial VLAN (i.e., $VLAN_{10}$) that has no IP address availability.

Note that, controller 245 may be configured to use other criteria to select the DHCP Offer too. Embodiments of the present disclosure provide a mechanism for VLAN assignment in addition to existing VLAN assignment mechanisms. Alternative mechanisms taking into account of one or more of such factors as the IP address availability in a DHCP pool, a responsive time associated with DHCP Offer messages for DHCP Discover messages corresponding to the selected VLAN; a link bandwidth between at least one network device outside of the selected VLAN and at least on network device in the selected VLAN; a number of client devices on the selected VLAN; etc.

Furthermore, with respect to non-selected VLAN (e.g., $VLAN_{30}$), controller 245 will immediately transmit a DHCP Request message (e.g., DHCP Request message 281) on the non-selected VLAN (e.g., $VLAN_{30}$) upon re-assignment of the VLAN to client device 200.

To release the reserved IP addresses from the non-selected VLANs, controller 245 will generate a DHCP Request message on each non-selected VLAN on behalf of client device 200, and transmit the generated DHCP Request messages to DHCP server 250. The DHCP Request messages have client device 200's unique identifier as the source address and the DHCP server's identifier as the destination address. Thus, the DHCP Request messages appear to be originated from client device 200, but are in fact generated by controller 245.

E. DHCP Request Message

Figure 2E:
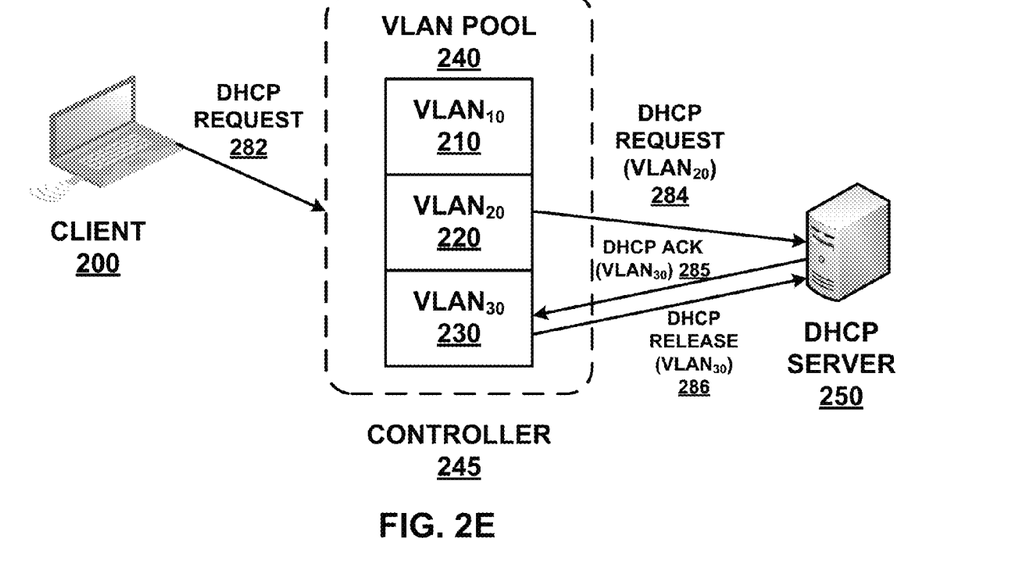

Referring to FIG. 2E, with respect to the selected VLAN (e.g., $VLAN_{20}$), controller 245 wait for client device 200 to respond to DHCP Offer message 280 with a DHCP Request message 282. In response to receiving DHCP Request message 282, controller 245 sends DHCP Request message 284 on the selected VLAN (e.g., $VLAN_{20}$).

With respect to the non-selected VLANs (e.g., $VLAN_{30}$), after DHCP server 250 responds with a DHCP Offer message on a particular VLAN, DHCP server 250 will reserve an IP address in the corresponding VLAN for a period of time (e.g., 2 minutes). Even if client device 200 does not accept the DHCP Offer message, DHCP server 250 will still hold the IP address and wait for client device 200 to respond during that period of time. Therefore, in order to prevent IP addresses from being exhausted by the DHCP Discover message flooding, controller 245 must immediately take additional actions to release the reserved IP addresses from the non-selected VLANs at DHCP server 250. Specifically, upon receiving DHCP ACK message 285 on $VLAN_{30}$ from DHCP server 250, controller 245 immediately will transmit a DHCP Release message 286 on VLAN30 to DHCP server 250 to release the reserved IP address from the DHCP pool corresponding to $VLAN_{30}$ on DHCP server 250.

F. DHCP Acknowledgement Message

Figure 2F:
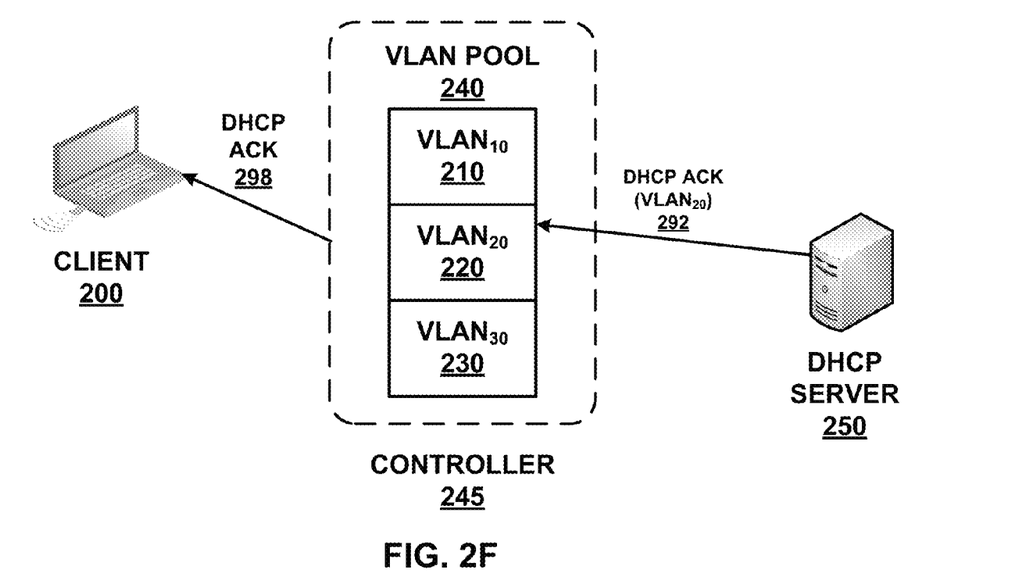

Referring to FIG. 2F, DHCP server 250 will reply with a DHCP Acknowledgement message upon receiving a respective DHCP Request message on a respective VLAN. For example, DHCP server 250 will send DHCP ACK 292 on $VLAN_{20}$ upon receiving DHCP Request 284 on $VLAN_{20}$. Likewise, DHCP server 250 will send DHCP ACK 294 on $VLAN_{30}$ upon receiving DHCP Request 286 on $VLAN_{20}$.

For the DHCP ACK messages received on non-selected VLANs (e.g., $VLAN_{30}$), controller 245 will immediately generate a DHCP Release message 296 on behalf of client device 200, and transmit the generated DHCP Release message on the non-selected VLAN (e.g., $VLAN_{30}$) to DHCP server 250. DHCP server 250 will immediately release the reserved IP address in the non-selected VLAN (e.g., $VLAN_{30}$) upon receiving DHCP Release message 296, and send a DHCP NACK message to controller 245.

For the DHCP ACK message received on the selected VLAN (e.g., $VLAN_{20}$), controller 245 will forward DHCP ACK message 298 to client device 200 to complete the DHCP transaction between client device 200 and DHCP server 250.

Process for Adaptive DHCP Assignment with VLAN Pool

Figure 3:
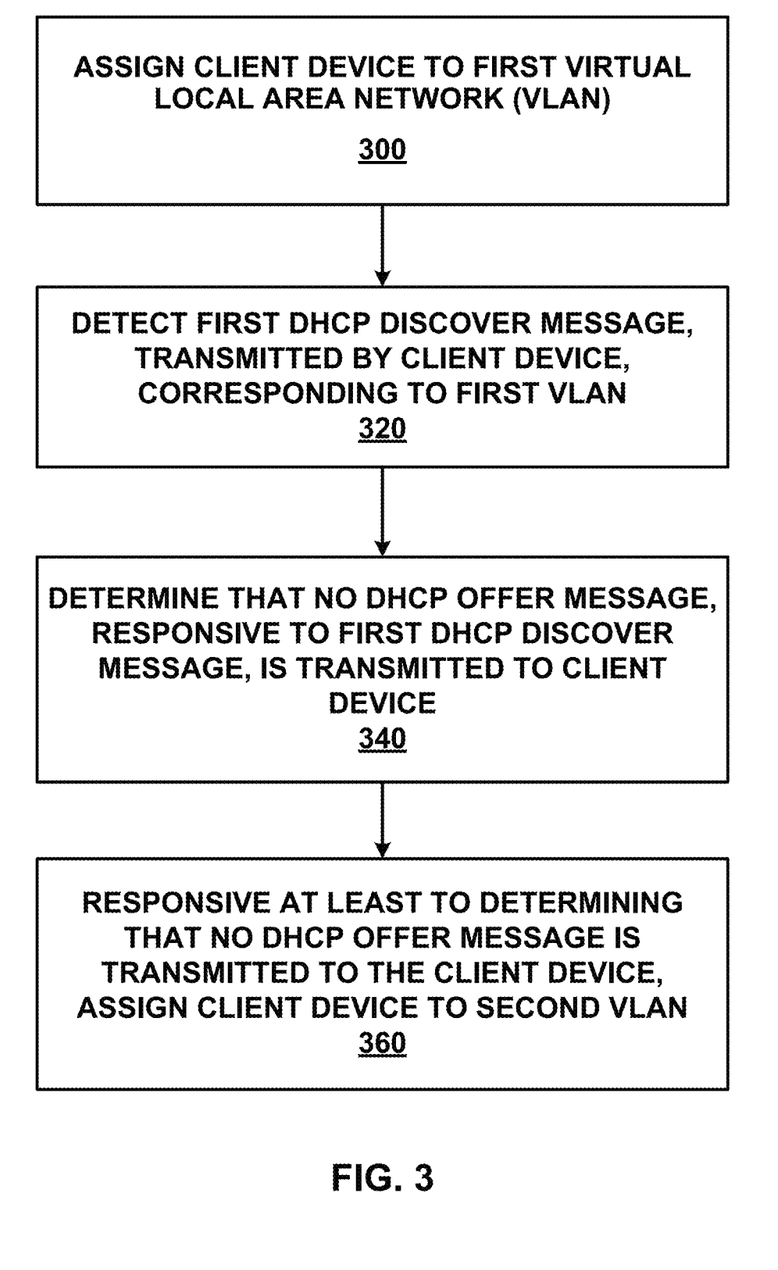
FIG. 3 illustrates an exemplary process for adaptive DHCP assignment with VLAN pool according to embodiments of the present disclosure.

FIG. 3 illustrates an exemplary process for adaptive DHCP assignment with VLAN pool according to embodiments of the present disclosure. During operations, a network device assigns a client device to a first VLAN (operation 300). The network device also detects a first DHCP Discover message, transmitted by a client device, corresponding to a first VLAN (operation 320). Then, the network device determines that no DHCP offer message, responsive to the first DHCP Discover message, is transmitted to the client device (operation 340). Responsive at least to determining that no DHCP offer message is transmitted to the client device, the network device assigns the client device to a second VLAN (operation 360). In some embodiments, the network device assigns the second VLAN to the client device based on determining that an Internet Protocol (IP) address is available on the second VLAN.

Moreover, the network device can further transmit a second DHCP Discover message corresponding to a second VLAN, and receives a DHCP offer message corresponding to the second DHCP Discover message.

In some embodiments, the network device assigns the client device to the second VLAN is responsive to determining that no DHCP offer message is transmitted to the client device in response to a threshold number of DHCP Discover messages transmitted by the client device. Note that, the second DHCP Discover message can be generated by a network device and incorrectly identifies the client device as a source of the second DHCP Discover message.

In some embodiments, the network device transmits a plurality of DHCP Discover messages corresponding to a plurality of VLANs other than the first VLAN, and receives at least a DHCP offer message corresponding to a second DHCP Discover message corresponding to the second VLAN.

In some embodiments, the network device transmits a second DHCP Discover message corresponding to a second VLAN, and receives a first DHCP offer message corresponding to the second DHCP Discover message. In addition, the network device transmits a third DHCP Discover message corresponding to a third VLAN, and receives a second DHCP Offer message corresponding to the third DHCP Discover message. Then, the network device transmits a DHCP Request message corresponding to the second DHCP Offer message, and receives a DHCP Assignment corresponding to the DHCP Request message. Next, the network device transmits a DHCP Release message corresponding to the DHCP Assignment.

In some embodiments, detecting the first DHCP Discover message can be performed by a controller that the client device is connected to. Furthermore, detecting the first DHCP Discovery message can be performed by snooping, by an intermediate device, a message transmitted by the client device to a DHCP server.

In some embodiments, the network device determines that no IP addresses are available on the first VLAN and refrains from assigning a client device to the first VLAN based on determining that no IP addresses are available on the first VLAN.

In some embodiments, the network device determines that no IP addresses are available on the first VLAN and transmits information to a plurality of network devices indicating that no IP addresses are available on the first VLAN.

In some embodiments, responsive to determining that no DHCP offer message is received in response to a plurality of DHCP Discover messages corresponding to the first VLAN and transmitted by one or more client devices, the network device determines that no IP addresses are available on the first VLAN.

In some embodiments, the network device assigns the client device to the second VLAN based on a responsive time associated with DHCP Offer messages for DHCP Discover messages corresponding to the second VLAN. In some embodiments, the network device assigns the client device to the second VLAN based on a link bandwidth between at least one network device outside of the second VLAN and at least on network device in the second VLAN. In some embodiments, the network device assigns the client device to the second VLAN based on a number of client devices on the second VLAN.

In some embodiments, the network device updates information on a network device indicating that the client device is assigned to the second VLAN, and transmits, on behalf of the client device and to a DHCP server, a second DHCP Discover message for the second VLAN. The network device then receives a DHCP Offer message in response to the second DHCP Discover message. Subsequent to assigning the client device to the second VLAN, the network device transmits the DHCP Offer message for the second VLAN, to the client device.

In some embodiments, the client device transmits a DHCP request message to the DHCP server in response to receiving the DHCP offer message from the network device.

In some embodiments, the network device also generates and stores a first set of one or more entries indicating that the client device is assigned to the second VLAN. Subsequent to generating and storing the first set of entries, the network device deletes a second set of one or more entries indicating that the client device is assigned to the first VLAN.

System for Adaptive DHCP Assignment with VLAN Pool

Figure 4:
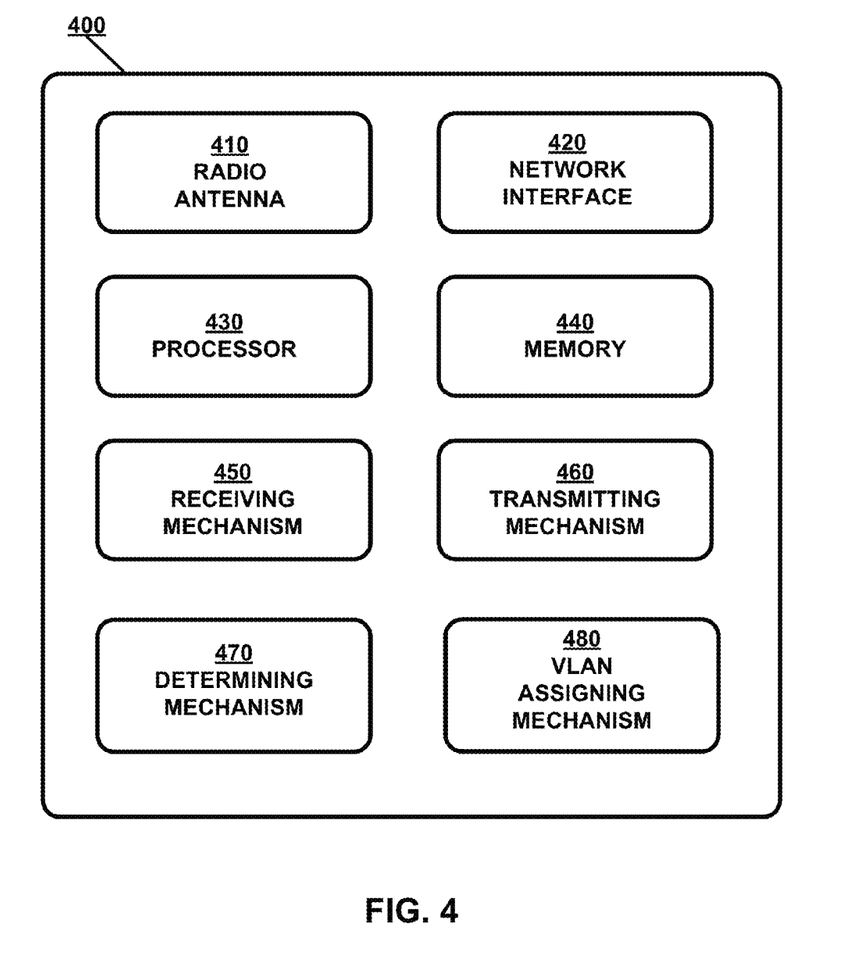
FIG. 4 is a block diagram illustrating an exemplary system for adaptive DHCP assignment with VLAN pool according to embodiments of the present disclosure.

FIG. 4 is a block diagram illustrating a system for adaptive DHCP assignment with VLAN pool according to embodiments of the present disclosure.

Network device 400 includes at least one or more radio antennas 410 capable of either transmitting or receiving radio signals or both, a network interface 420 capable of communicating to a wired or wireless network, a processor 430 capable of processing computing instructions, and a memory 440 capable of storing instructions and data. Moreover, network device 400 further includes an receiving mechanism 450, a transmitting mechanism 460, a determining mechanism 470, and a VLAN assigning mechanism 480, all of which are in communication with processor 430 and/or memory 440 in network device 400. Network device 400 may be used as a client system, or a server system, or may serve both as a client and a server in a distributed or a cloud computing environment.

Radio antenna 410 may be any combination of known or conventional electrical components for receipt of signaling, including but not limited to, transistors, capacitors, resistors, multiplexers, wiring, registers, diodes or any other electrical components known or later become known.

Network interface 420 can be any communication interface, which includes but is not limited to, a modem, token ring interface, Ethernet interface, wireless IEEE 802.11 interface, cellular wireless interface, satellite transmission interface, or any other interface for coupling network devices.

Processor 430 can include one or more microprocessors and/or network processors. Memory 440 can include storage components, such as, Dynamic Random Access Memory (DRAM), Static Random Access Memory (SRAM), etc.

Receiving mechanism 450 generally receives one or more network messages via network interface 420 or radio antenna 410 from a wireless client. The received network messages may include, but are not limited to, requests and/or responses, beacon frames, management frames, control path frames, and so on. Specifically, receiving mechanism 450 receives a first DHCP Offer message corresponding to the second DHCP Discover message, and a second DHCP Offer message corresponding to the third DHCP Discover message. Receiving mechanism 450 also can receive a DHCP Assignment message corresponding to the DHCP Request message. Further, receiving mechanism 450 can receive a DHCP Offer message in response to the second DHCP Discover message.

Transmitting mechanism 460 generally transmits messages, which include, but are not limited to, requests and/or responses, beacon frames, management frames, control path frames, and so on. Specifically, transmitting mechanism 460 can transmit a second DHCP Discover message corresponding to a second VLAN, and a third DHCP Discover message corresponding to a third VLAN. Moreover, transmitting mechanism 460 can transmit a DHCP Request message corresponding to the second DHCP Offer message. In addition, transmitting mechanism 460 can transmit a DHCP Release message corresponding to the DHCP Assignment message. In some embodiments, transmitting mechanism 460 transmits, on behalf of the client device and to a DHCP server, a second DHCP Discover message on the second VLAN. Subsequent to assigning the client device to the second VLAN, transmitting mechanism 460 can also transmit the DHCP Offer message for the second VLAN, to the client device. The client device transmits a DHCP Request message to the DHCP server in response to receiving the DHCP Offer message from transmitting mechanism 460 of network device 400.

Determining mechanism 470 generally determines whether a VLAN needs to be assigned or re-assigned to a client device. Specifically, in some embodiments, determining mechanism 470 detects a first DHCP Discover message, transmitted by a client device, corresponding to a first VLAN. The detection can be performed by an intermediate device that snoops a message transmitted by the client device to a DHCP server.

In some embodiments, determining mechanism 470 determines that no DHCP Offer message, responsive to the first DHCP Discover message, is transmitted to the client device.

In some embodiments, determining mechanism 470 determines that no IP addresses are available on the first VLAN, and causes VLAN assigning mechanism 480 refrains from assigning a client device to the first VLAN.

In some embodiments, determining mechanism 480 determines that no IP addresses are available on the first VLAN, and causes transmitting mechanism 460 to transmit information to a plurality of network devices indicating that no IP addresses are available on the first VLAN.

In some embodiments, determining that no IP addresses are available on the first VLAN is responsive to determining that no DHCP Offer message is received in response to a plurality of DHCP Discover messages corresponding to the first VLAN and transmitted by one or more client devices.

VLAN assigning mechanism 480 generally assigns a VLAN to a client device. Specifically, VLAN assigning mechanism 480 can assign a client device to a first Virtual Local Area Network (VLAN). Responsive at least to determining mechanism 470 determines that no DHCP offer message is transmitted to the client device, VLAN assigning mechanism 480 assigns the client device to a second VLAN.

Moreover, in some embodiments, VLAN assigning mechanism 480 can assign the second VLAN to the client device based on determining that an Internet Protocol (IP) address is available on the second VLAN.

In some embodiments, VLAN assigning mechanism 480 assigns the client device to the second VLAN responsive to transmitting mechanism 460 transmitting a second DHCP Discover message corresponding to a second VLAN, and receiving mechanism 450 receiving a DHCP Offer message corresponding to the second DHCP Discover message.

In some embodiments, VLAN assigning mechanism 480 assigns the client device to the second VLAN responsive to determining mechanism 470 determines that no DHCP Offer message is transmitted to the client device in response to a threshold number of DHCP Discover messages transmitted by the client device. Note that, the second DHCP Discover message may be generated by a network device and incorrectly identifies the client device as a source of the second DHCP Discover message.

In some embodiments, VLAN assigning mechanism 480 assigns the client device to the second VLAN responsive to transmitting mechanism 460 transmitting a plurality of DHCP Discover messages corresponding to a plurality of VLANs other than the first VLAN, and receiving mechanism 450 receiving at least a DHCP Offer message corresponding to a second DHCP Discover message corresponding to the second VLAN.

In some embodiments, VLAN assigning mechanism 480 assigns the client device to the second VLAN by selecting the second VLAN from a plurality of VLANs based on a responsive time associated with DHCP Offer messages for DHCP Discover messages corresponding to the second VLAN.

In some embodiments, VLAN assigning mechanism 480 assigns the client device to the second VLAN by selecting the second VLAN from a plurality of VLANs based on a link bandwidth between at least one network device outside of the second VLAN and at least on network device in the second VLAN.

In some embodiments, VLAN assigning mechanism 480 assigns the client device to the second VLAN by selecting the second VLAN from a plurality of VLANs based on a number of client devices on the second VLAN.

Furthermore, VLAN assigning mechanism 480 can update information on a network device indicating that the client device is assigned to the second VLAN. Also, VLAN assigning mechanism 480 can generate and store a first set of one or more entries indicating that the client device is assigned to the second VLAN. Subsequent to generating and storing the first set of entries, VLAN assigning mechanism 480 deletes a second set of one or more entries indicating that the client device is assigned to the first VLAN.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
   assigning a client device to a first Virtual Local Area Network (VLAN);
   detecting a first DHCP Discover message, transmitted by the client device, corresponding to the first VLAN;
   determining that no DHCP offer message, responsive to the first DHCP Discover message, is transmitted to the client device; and
   responsive at least to determining that no DHCP offer message is transmitted to the client device in response to a threshold number of DHCP Discover messages transmitted by the client device, assigning the client device to a second VLAN.

2. The medium of claim 1, wherein assigning the second VLAN to the client device is further based on determining that an Internet Protocol (IP) address is available on the second VLAN.

3. The medium of claim 1, wherein assigning the client device to the second VLAN is further responsive to:
   transmitting, by a network device, a second DHCP Discover message corresponding to a second VLAN;
   receiving, by the network device, a DHCP offer message corresponding to the second DHCP Discover message.

4. The medium of claim 1, wherein the second DHCP Discover message is generated by a network device and incorrectly identifies the client device as a source of the second DHCP Discover message.

5. The medium of claim 1, wherein assigning the client device to the second VLAN is further response to:
   transmitting, by a network device, a plurality of DHCP Discover messages corresponding to a plurality of VLANs other than the first VLAN; and
   receiving, by the network device, at least a DHCP offer message corresponding to a second DHCP Discover message corresponding to the second VLAN.

6. The medium of claim 1, wherein the operations further comprise:
   transmitting, by a network device, a second DHCP Discover message corresponding to a second VLAN,
   receiving, by the network device, a first DHCP offer message corresponding to the second DHCP Discover message;
   transmitting, by the network device, a third DHCP Discover message corresponding to a third VLAN;
   receiving, by the network device, a second DHCP offer message corresponding to the third DHCP Discover message;
   transmitting, by the network device, a DHCP request message corresponding to the second DHCP offer message;
   receiving, by the network device, a DHCP assignment corresponding to the DHCP request message; and
   transmitting, by the network device, a DHCP release message corresponding to the DHCP assignment.

7. The medium of claim 1, wherein the detecting operation is performed by a controller associated with the client device.

8. The medium of claim 1, wherein the operations further comprise determining that no IP addresses are available on the first VLAN and refraining from assigning a client device to the first VLAN based on determining that no IP addresses are available on the first VLAN.

9. The medium of claim 1, wherein the operations further comprise determining that no IP addresses are available on the first VLAN and transmitting information to a plurality of network devices indicating that no IP addresses are available on the first VLAN.

10. The medium of claim 9, wherein determining that no IP addresses are available on the first VLAN is responsive to determining that no DHCP offer message is received in response to a plurality of DHCP Discover messages corresponding to the first VLAN and transmitted by one or more client devices.

11. The medium of claim 1, wherein the detecting operation is performed by snooping, by an intermediate device, a message transmitted by the client device to a DHCP server.

12. The medium of claim 1, wherein assigning the client device to the second VLAN is further based on selecting the second VLAN from a plurality of VLANs based on:
   a responsive time associated with DHCP Offer messages for DHCP Discover messages corresponding to the second VLAN.

13. The medium of claim 1, wherein assigning the client device to the second VLAN is further based on selecting the second VLAN from a plurality of VLANs based on:
   a link bandwidth between at least one network device outside of the second VLAN and at least on network device in the second VLAN.

14. The medium of claim 1, wherein assigning the client device to the second VLAN is further based on selecting the second VLAN from a plurality of VLANs based on:
   a number of client devices on the second VLAN.

15. The medium of claim 1, wherein assigning the client device to the second VLAN comprises updating information on a network device indicating that the client device is assigned to the second VLAN, and wherein the operations further comprise:

transmitting, by a network device on behalf of the client device and to a DHCP server, a second DHCP Discover message for the second VLAN, receiving, by the network device, a DHCP Offer message in response to the second DHCP Discover message; and subsequent to assigning the client device to the second VLAN: transmitting, the DHCP Offer message for the second VLAN, to the client device.

16. The medium of claim 15, wherein the client device transmits a DHCP request message to the DHCP server in response to receiving the DHCP offer message from the network device.

17. The medium of claim 15, wherein assigning the client device to the second VLAN comprises:

generating and storing a first set of one or more entries indicating that the client device is assigned to the second VLAN;

subsequent to generating and storing the first set of entries, deleting a second set of one or more entries indicating that the client device is assigned to the first VLAN.

18. A system comprising:

a hardware processor;

the hardware processor being configured to perform operations comprising:

assigning a client device to a first Virtual Local Area Network (VLAN);

detecting a first DHCP Discover message, transmitted by the client device, corresponding to the first VLAN;

determining that no DHCP offer message, responsive to the first DHCP Discover message, is transmitted to the client device; and responsive at least to determining that no DHCP offer message is transmitted to the client device in response to a threshold number of DHCP Discover messages transmitted by the client device, assigning the client device to a second VLAN.

19. The system of claim 18, wherein the operations further comprise:

transmitting, by a network device on behalf of the client device and to a DHCP server, a second DHCP Discover message for the second VLAN, receiving, by the network device, a DHCP Offer message in response to the second DHCP Discover message; and subsequent to assigning the client device to the second VLAN: transmitting, the DHCP Offer message for the second VLAN, to the client device.

* * * * *